(12) United States Patent
Ku et al.

(10) Patent No.: US 10,191,624 B2
(45) Date of Patent: Jan. 29, 2019

(54) SYSTEM AND METHOD FOR AUTHORING INTERACTIVE MEDIA ASSETS

(71) Applicant: OATH INC., New York, NY (US)

(72) Inventors: Hans T. Ku, La Canada Flintridge, CA (US); David M. Koenig, Los Angeles, CA (US); Edwin R. Leonard, Glendora, CA (US); David Moore, Pasadena, CA (US)

(73) Assignee: OATH INC., New York, NY (US)

( * ) Notice: Subject to any disclaimer, the term of this patent is extended or adjusted under 35 U.S.C. 154(b) by 223 days.

(21) Appl. No.: 13/867,990

(22) Filed: Apr. 22, 2013

(65) Prior Publication Data

US 2014/0317510 A1 Oct. 23, 2014
US 2016/0179314 A9 Jun. 23, 2016

Related U.S. Application Data

(60) Provisional application No. 61/649,916, filed on May 21, 2012.

(51) Int. Cl.
*G06F 3/00* (2006.01)
*G06F 3/0484* (2013.01)
*G11B 27/031* (2006.01)

(52) U.S. Cl.
CPC .......... *G06F 3/0484* (2013.01); *G11B 27/031* (2013.01)

(58) Field of Classification Search
None
See application file for complete search history.

(56) References Cited

U.S. PATENT DOCUMENTS

| | | |
|---|---|---|
| 6,295,058 B1 | 9/2001 | Hsu et al. |
| 6,389,181 B2 | 5/2002 | Shaffer et al. |
| 6,473,778 B1 | 10/2002 | Gibbon |
| 6,590,586 B1 | 7/2003 | Swenton-Wall et al. |
| 6,964,025 B2 | 11/2005 | Angiulo et al. |

(Continued)

FOREIGN PATENT DOCUMENTS

| | | |
|---|---|---|
| KR | 1020060058607 | 5/2006 |
| KR | 1020080060235 | 7/2008 |
| KR | 1020080080961 | 9/2008 |

OTHER PUBLICATIONS

International Search Report (PCT/US2014/035034) dated Aug. 22, 2014; 3 pages.

*Primary Examiner* — Anil N Kumar
(74) *Attorney, Agent, or Firm* — James J. DeCarlo; Greenberg Traurig, LLP (57) ABSTRACT

The present disclosure provides systems and methods for creating social media videos based on media assets. A computing device displays a graphical user interface ("GUI") for creating the social media video. The GUI includes a first region for selecting a media asset and a second region for displaying selected media assets. The device receives a user selection of the first media asset for use in a social media video. The device obtains a first metadata information associated with the first media asset, obtains a second media asset based at least in part on the first metadata information, and displays, in the first region, a thumbnail image of the second media asset. The second media asset is obtained based on first metadata information. In this way, related media assets are retrieved and display to optimize the creation of social media videos.

42 Claims, 7 Drawing Sheets

(56) References Cited

U.S. PATENT DOCUMENTS

| | | |
|---|---|---|
| 7,003,583 B2 | 2/2006 | Cho et al. |
| 7,349,923 B2 | 3/2008 | Spring et al. |
| 7,362,919 B2 | 4/2008 | Das et al. |
| 7,657,835 B2 | 2/2010 | Mindrum et al. |
| 7,680,882 B2 * | 3/2010 | Tiu, Jr. ............... G06F 17/3089 709/203 |
| 7,823,058 B2 * | 10/2010 | Pea ...................... H04N 5/262 345/620 |
| 7,849,083 B2 | 12/2010 | Fitzpatrick |
| 7,979,790 B2 | 7/2011 | Truelove et al. |
| 8,010,629 B2 | 8/2011 | Lanahan et al. |
| 8,880,534 B1 * | 11/2014 | Aradhye et al. ............ 707/748 |
| 2005/0246649 A1 | 11/2005 | Wilhelm |
| 2006/0004892 A1 | 1/2006 | Lunt et al. |
| 2006/0253783 A1 | 11/2006 | Vronay et al. |
| 2007/0043761 A1 | 2/2007 | Chim et al. |
| 2007/0073776 A1 | 3/2007 | Kalalian et al. |
| 2007/0101271 A1 | 5/2007 | Hua et al. |
| 2007/0255785 A1 | 11/2007 | Hayashi et al. |
| 2008/0052349 A1 | 2/2008 | Lin |
| 2008/0092051 A1 | 4/2008 | Sidon et al. |
| 2008/0133658 A1 | 6/2008 | Pennington |
| 2008/0189591 A1 | 8/2008 | Lection |
| 2008/0205694 A1 | 8/2008 | Sagoo et al. |
| 2008/0215964 A1 | 9/2008 | Abrams et al. |
| 2008/0215965 A1 | 9/2008 | Abrams et al. |
| 2008/0215985 A1 | 9/2008 | Batchelder et al. |
| 2009/0083646 A1 | 3/2009 | Lin et al. |
| 2009/0132527 A1 | 5/2009 | Sheshagiri et al. |
| 2009/0144392 A1 | 6/2009 | Wang et al. |
| 2009/0198823 A1 | 8/2009 | Bannister et al. |
| 2009/0254643 A1 | 10/2009 | Terheggen et al. |
| 2009/0259944 A1 | 10/2009 | Wu |
| 2009/0319472 A1 | 12/2009 | Jain et al. |
| 2009/0327035 A1 | 12/2009 | Allard |
| 2010/0005119 A1 | 1/2010 | Howard et al. |
| 2010/0005139 A1 | 1/2010 | Lanahan et al. |
| 2010/0042926 A1 | 2/2010 | Bull et al. |
| 2010/0083141 A1 | 4/2010 | Grace |
| 2010/0161635 A1 | 6/2010 | Dey |
| 2010/0172551 A1 * | 7/2010 | Gilley ............... G06K 9/00288 382/118 |
| 2010/0220197 A1 | 9/2010 | Dukellis et al. |
| 2010/0281372 A1 * | 11/2010 | Lyons ................. G11B 27/034 715/720 |
| 2010/0325547 A1 | 12/2010 | Keng et al. |
| 2011/0096144 A1 | 4/2011 | Pea et al. |
| 2012/0030569 A1 * | 2/2012 | Migos ................. G06F 3/04845 715/702 |
| 2012/0036444 A1 * | 2/2012 | Andersen ...................... 715/738 |
| 2012/0221687 A1 * | 8/2012 | Hunter ............. G06F 17/30029 709/219 |
| 2012/0272126 A1 * | 10/2012 | Atkins et al. ................. 715/202 |
| 2013/0091431 A1 * | 4/2013 | Master ............. H04N 21/44008 715/719 |
| 2013/0159243 A1 * | 6/2013 | Wei et al. ...................... 706/54 |
| 2013/0290905 A1 * | 10/2013 | LuVogt et al. ............... 715/835 |
| 2014/0137043 A1 * | 5/2014 | Matas ........................... 715/835 |
| 2014/0173396 A1 * | 6/2014 | Imbruce et al. ............. 715/202 |

* cited by examiner

SYSTEM AND METHOD FOR AUTHORING INTERACTIVE MEDIA ASSETS

CROSS REFERENCE TO RELATED APPLICATIONS

This application claims the benefit of priority from U.S. Provisional Patent Application No. 61/649,916, filed on May 21, 2012, which is incorporated herein by reference.

BACKGROUND

1. Field

The present disclosure relates generally to the social media, and more specifically, to user interfaces for authoring social media videos.

2. Description of Related Art

Social media technologies described in U.S. Provisional Patent Application No. 61/649,916, filed on May 21, 2012, provide for the authoring of social media content using media assets, and are hereby incorporated by reference for all purposes. Media assets are visual and/or aural digital objects, such as computer images, video clips, audio clips, text verbiages, or the like. Media assets may be stored at a variety of sources, e.g., social networking web sites, cloud-based image repositories, local repositories of portable computing devices, and the like.

Given the limited display screen sizes of computing devices that are often used to author social media (e.g., smartphones), and the large pool of media assets that are often available via social media for use in social media content authoring, it would be advantageous to present relevant media assets in organized manners to facilitate social media content authoring.

SUMMARY

In some embodiments, a computer-implemented method for creating a social media video includes causing to be displayed, on one or more display screens, a user interface for creating the social media video, where the user interface includes a first region for selecting a media asset and a second region for displaying selected media assets, and the first region includes a first icon representing a first media asset. The method includes receiving a user selection of the first media asset from a user input device. The user selection is a swipe of the first icon from the first region towards the second region. The method includes obtaining a first metadata information associated with the first media asset, obtaining a second icon representing a second icon representing a second media asset based at least in part on the first metadata information, and causing to be displayed, in the first region, the second icon representing the second media asset. The second media asset is obtained based on the first metadata information.

In some embodiments, the method includes obtaining, from a global positioning system (GPS) sensor, a GPS location of a computing device, and causes to be displayed the first icon representing the first media asset if the first metadata information indicates a first location within a predetermined distance of the GPS location of the computing device.

In some embodiments, the first metadata information includes a first location information that indicates the location at which the first media asset was created, and the second media asset was created at a location within a predetermined distance of the first location. In some embodiments, the first metadata information includes a first timestamp indicating a date and/or time at which the first media asset was created, and the second media asset was created within a timespan before or after the first timestamp.

In some embodiments, the first metadata information comprises a social graph information, the social graph information identifies a first node of a social graph, the second media asset is associated with a second node of the social graph, and the first node and the second node are connected on the social graph. In some embodiments, the social graph is a social graph of a social networking web site.

In some embodiments, when metadata of the first media asset indicates that the first media asset was created within a predetermined distance of a business, the second media asset represents the business. In some embodiments, the second media asset is an advertisement for the business or includes a picture of the business.

In some embodiments, the first metadata information includes image recognition information generated by an image recognition algorithm based on the first media asset, and the second icon representing the second media asset is displayed based on the image recognition information. The recognition information may be generated using facial recognition, object recognition, and/or color matching technologies.

In some embodiments, the first media asset includes audio, the audio is analyzed, and the second icon representing the second media asset is displayed based on the analysis of the audio.

In some embodiments, a non-transitory computer-readable storage medium having computer-executable instructions for creating a social media video includes instructions for causing to be displayed, on one or more display screens, a user interface for creating the social media video, where the user interface includes a first region for selecting a media asset and a second region for displaying selected media assets, and the first region includes a first icon representing a first media asset. The instructions include receiving a user selection of the first media asset from a user input device. The user selection is a swipe of the first icon from the first region towards the second region. The instructions include obtaining a first metadata information associated with the first media asset, obtaining a second icon representing a second media asset based at least in part on the first metadata information, and causing to be displayed, in the first region, the second icon representing the second media asset. The second media asset is obtained based on the first metadata information.

In some embodiments, a computing device for creating a social media video based on media assets includes one or more processors operatively coupled to one or more display screens, a user input device, and a network interface, where the network interface is configured to connect with a network. The one or more processors are configured to cause to be displayed, on the one or more display screens, a user interface for creating the social media video, where the user interface includes a first region for selecting a media asset and a second region for displaying selected media assets, and the first region includes a first icon representing a first media asset. The one or more processors are configured to receive, from the user input device, a user selection of the first media asset. The user selection is a swipe of the first icon from the first region towards the second region. The one or more processors are configured to obtain a first metadata information associated with the first media asset, obtain a second icon representing a second media asset based at least in part on the first metadata information, and cause to be displayed, in the first region, the second icon representing the second media asset. The second media asset is obtained based on first metadata information.

DETAILED DESCRIPTION

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the various embodiments. Thus, the various embodiments are not intended to be limited to the examples described herein and shown, but are to be accorded the scope consistent with the claims.

The embodiments described herein include technologies directed to the blogging of interactive videos in the social media ("Social Media Video"). In some embodiments, a native application that operates on a computing device includes computer-executable instructions for authoring and viewing Social Media Videos. For example, the native application may be an APPLE iOS "app" or a GOOGLE ANDROID "application" or "widget".

1. Social Media Videos

A user authors a Social Media Video using media assets. Media assets are visual and/or aural digital objects, such as computer images, video clips, audio clips, text verbiages, or the like. For instance, a computer media object in the form of a PNG file constitutes a media asset. Media assets may be obtained from various sources, e.g., the memory of a computing device, a social media website, a Social Media Video service provider, a cloud-based repository of media assets, and so forth. A source of media assets may be referred to as a media asset feed.

Figure 1A:
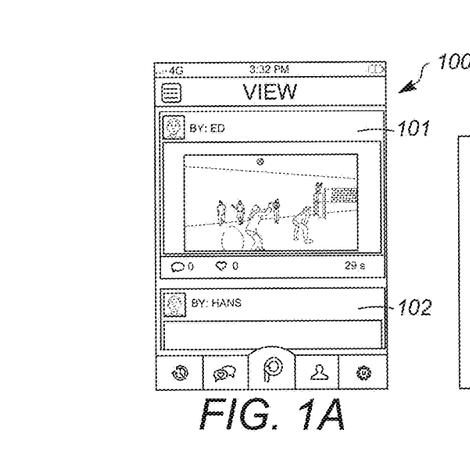
FIGS. 1A-1E depict an exemplary viewing of a Social Media Video.
Figure 1B:
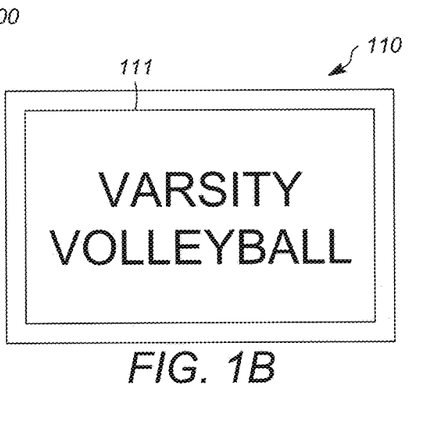
Figure 1C:
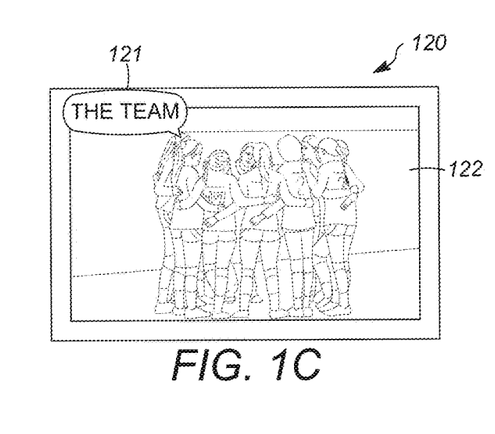
Figure 1D:
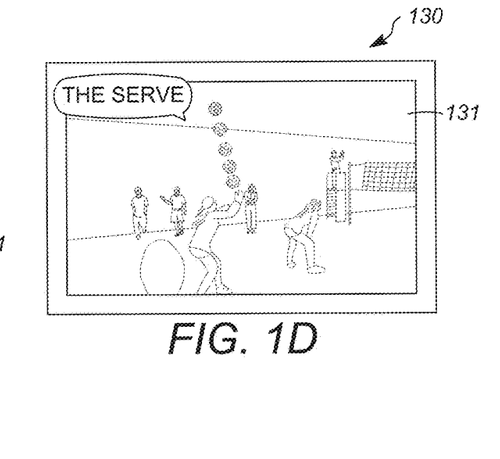
Figure 1E:
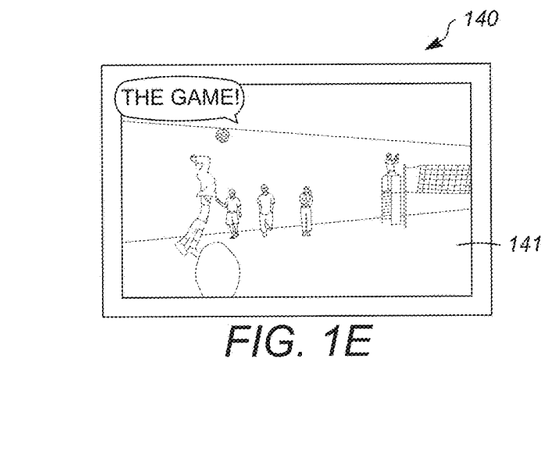

FIGS. 1A-1E illustrate an exemplary display of a Social Media Video on a computing device that is local to a user. In FIG. 1A, thumbnail images representing Social Media Videos 101-102 are displayed on screen 100 of the local computing device. FIGS. 1B-1E illustrate an exemplary viewing of Social Media Video 101 in response to a user's selection of the corresponding thumbnail image. Social Media Video 101 begins with a display of text 111, which indicates that the topic of Social Media Video 101 is a volleyball game. After a while, the view transitions to a display of text 121 overlaid onto image 122, which is a still image of a volleyball team. After a while, the view further transitions to a display of video clip 131, which shows a segment of gameplay. The viewing of Social Media Video 101 concludes with a display of image 141, which is a still image of the final play of the game. The viewing of video 101 may be accompanied by audio.

Figure 2A:
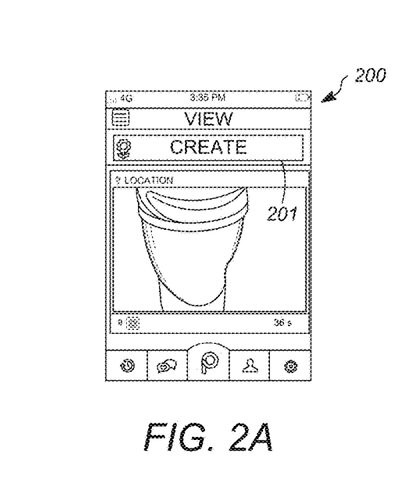
FIGS. 2A-2D depict an exemplary user interface for authoring a Social Media Video.
Figure 2B:
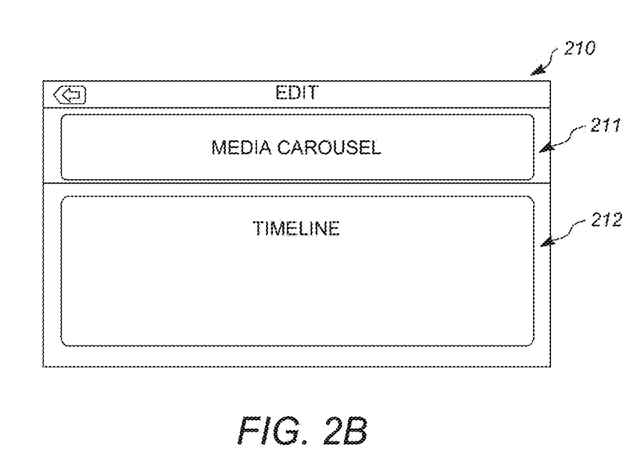

FIGS. 2A-2D illustrate an exemplary authoring of a Social Media Video on a computing device. Button 201, shown in in FIG. 2A, initiates the Social Media Video authoring process. In response to a user's selection of button 201, editing view 210, shown in FIG. 2B, is displayed on a screen of the computing device. The term "view" is used here to refer to software and/or hardware components provided by a computer device and its operating system/platform for displaying a user interface, which as one of ordinary skill in the art would appreciate, encompass operating system-specific functionalities that are sometimes described by the same term. That is to say, editing view 210 may be provided by, e.g., MICROSOFT WINDOWS's windows and dialog components. Editing view 210 may also be provided by, e.g., APPLE iOS views and GOOGLE ANDROID views. Multiple views may be displayed on one physical display screen or be displayed across multiple display screens. A single view may also be displayed on one physical display screen or be displayed across multiple display screens.

Figure 2C:
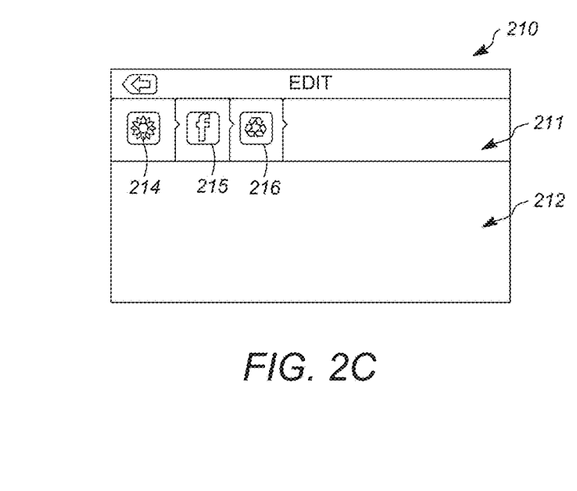
Figure 2D:
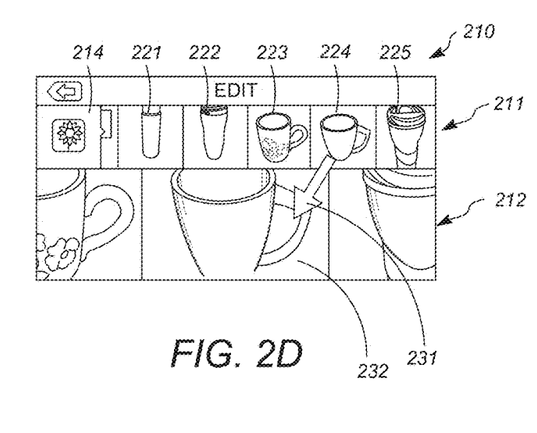

A view may have multiple regions. Editing view 210 includes two regions. A first region, called "media carousel" 211, displays icons that each represents a media asset feed and/or a media asset. As shown in FIG. 2C, media carousel 211 initially displays icons, e.g., icons 214-216, that represent media asset feeds. A user may select a media asset feed icon that is displayed in media carousel 211. As illustrated in FIG. 2D, when a displayed media asset feed icon is selected, thumbnail versions of media assets that are available from the selected media asset feed are displayed in media carousel 211. More specifically, FIG. 2D illustrates icons 221-225, which each represents a media asset that is available from the media assets feed corresponding to icon 214, being displayed in media carousel 211.

Editing view 210 (FIG. 2B) also includes a second region called "timeline" 212. Timeline 212 displays the contents of the Social Media Video that is being authored. Media assets can be added from media carousel 211 to timeline 212 via user input. More specifically, as shown in FIG. 2D by block arrow 231, a user may swipe an icon, e.g., icon 224, downwardly from media carousel 211 to timeline 212 to add a corresponding media asset to the Social Media Video that is being authored. Also, a user may add a media asset to the Social Media Video by tapping the icon that represents the media asset. Once a media asset is added to the Social Media Video, a larger version 232 of the added media asset is displayed in the timeline among other media assets of the Social Media Video. The ordering of images on timeline 212 corresponds to the order in which the corresponding media assets are to be displayed during playback of the Social Media Video. In this way, a Social Media Video comprising various media assets may be authored using editing view 210.

Note, although FIGS. 2B-2D depict editing view 210 as having two regions, in some embodiments, editing view 210 has more than two regions. For instance, an additional region may be used to provide additional editing capabilities such as music selection or theme selection.

Also, although not shown, the user interface that is provided by editing view 210 may be implemented using multiple views. For example, the first region media carousel 211 and timeline 212 may each be displayed in its respective view. The two corresponding views may be displayed on the same or across different physical display screens. That is, the above-described user interface may be adapted to take advantage of additional display hardware offered by a multi-display screen computing device.

2. Media Carousel

Media carousel 211 (FIG. 2B) may be populated dynamically based on conditions or criteria to increase the relevance of media assets that are displayed to a user. For example, a user who is authoring a Social Media Video of a wedding party may be more interested in media assets directed to the same wedding. It is thus beneficial for media carousel 211 to prioritize the display of media assets that are directed to the same wedding. As discussed further below, media carousel 211 may rely on metadata information associated with media assets (e.g., date/time, author, title, description, location) and/or information obtained through sensors (e.g., date/time, location, direction) to facilitate the display of more relevant media assets. In addition, media carousel 211 may rely on social networking information (e.g., social graph, user demographics) to facilitate the display of more relevant media assets.

FIG. 3 depicts an exemplary scenario where a media carousel is populated based on date/time, location, and a social graph of the user. As illustrated in FIG. 3A, user 301 and friend 303 are both in attendance at volleyball game 300 but are seated at different locations. User 301 and friend 303 are both users of a social networking web site, e.g., FACEBOOK, and have profile accounts that are connected to each other on a social graph of the social networking web site. User 301 and friend 303 have different perspectives of the game because the former sits near sideline 302 while the latter sits behind backline 304 of the volleyball court.

Figure 3A:
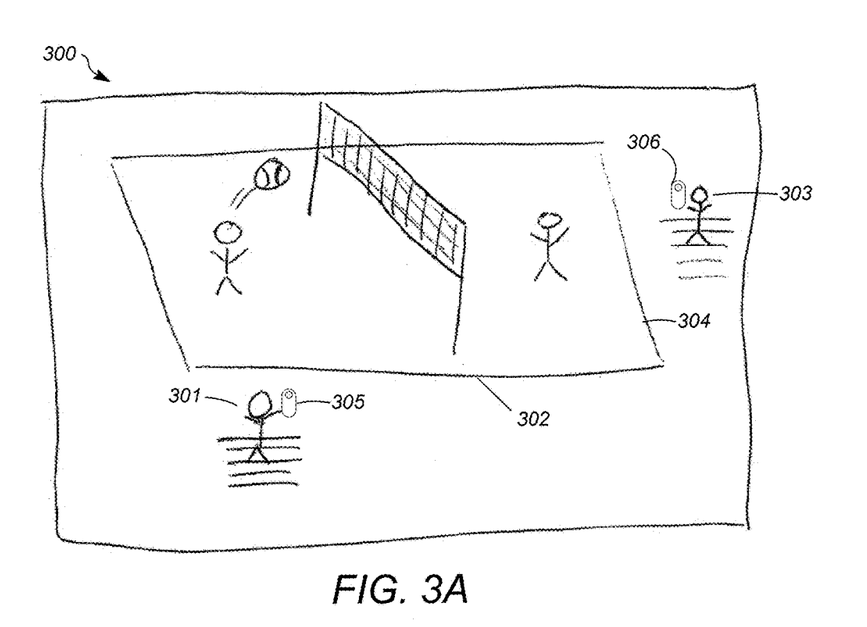
FIGS. 3A-3E depict an exemplary scenario for populating a media carousel.
Figure 3B:
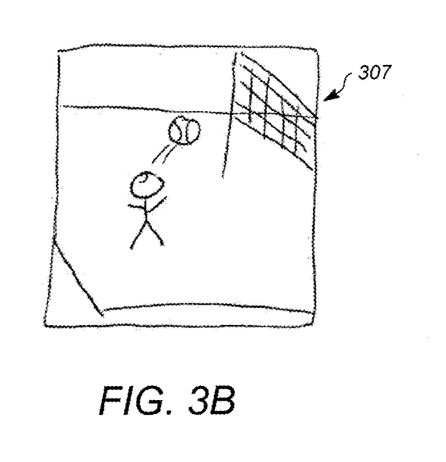
Figure 3C:
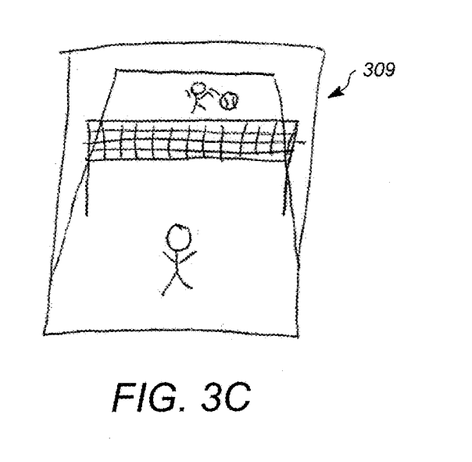

During game play, user 301 uses computing device 305, e.g., a smartphone, to obtain photographs and video clips of volleyball game 300 in order to author a Social Media Video based on the game play. As illustrated by FIG. 3B, the photographs, such as photograph 307, obtained by user 301 are limited to the sideline view because user 301 sits near sideline 302. Coincidentally, friend 303 also uses a computing device 306 to obtain photographs including photograph 309 (FIG. 3C) of the game play from the backline perspective of the volleyball court. Friend 303 does not author any Social Media Videos, but nonetheless uploads her photograph 309 to a social networking web site where she is socially connected to user 301.

Figure 3D:
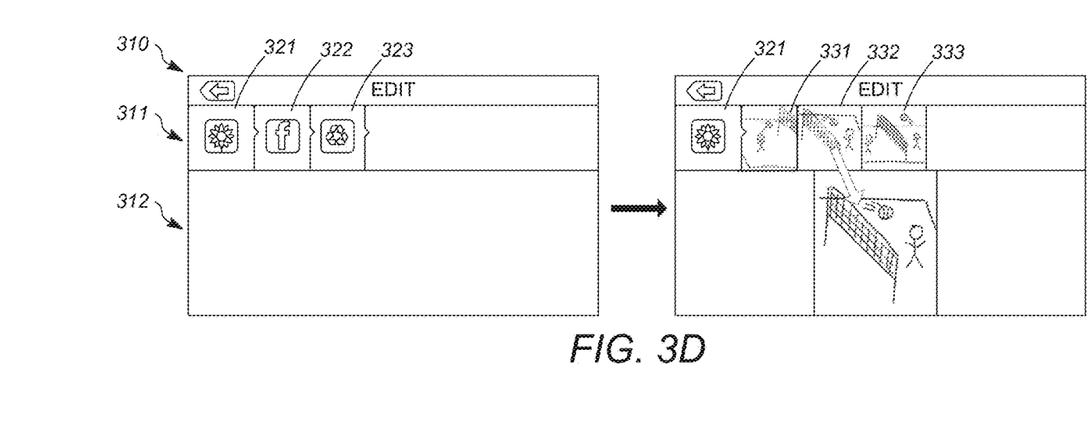

When user 301 uses editing view 310 shown in FIG. 3D to author a Social Media Video, media carousel 311 prioritizes the display of media assets that are related to volleyball game 300 to increase the relevance of displayed media assets. For example, as shown in FIG. 3D, when the user selects icon 321, which represents the local storage of computing device 305, thumbnail versions of media assets 331-333 (e.g., photographs) that are taken recently and that were taken near the current global positioning system (GPS) location of computing device 305 may be prioritized for display. Two GPS coordinates may be considered to be near one another when they are separated by less than a predetermined distance. For example, a radius of 300 feet may be useful for determining whether two photographs are likely to be taken on the same city block, or, in the present example, in the same stadium. That is, media assets 331-333 may be taken or otherwise created at locations that are within 300 feet of one another. User 301 adds media asset 332 into the Social Media Video by swiping the icon representing media asset 332 into timeline 312.

Figure 3E:
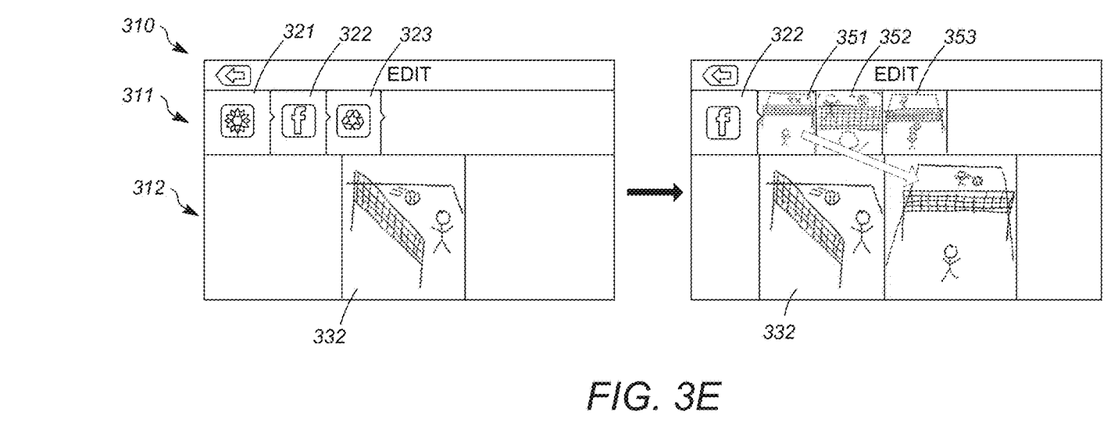

As another example, as shown in FIG. 3E, after media asset 332 is added to timeline 312, media carousel 311 may use media asset 332 to increase the relevance of other media assets that are displayed in media carousel 311. More specifically, when user 301 selects icon 322, which represents a social networking web site where user 301 is socially connected to friend 303, media carousel 311 prioritizes the display of media assets that were taken near the GPS location of media asset 332, at about the same time as when media asset 332 was taken, and by those who are socially connected with user 301 (e.g., friend 303). That is, media carousel 311 may display thumbnail versions of media assets 351-353 representing photographs of volleyball game 300 that were taken by user 303.

Thus, media carousel 311 dynamically controls its display of media assets using metadata information associated with media assets and/or information associated with the local computing device. In this way, media carousel 311 provides a user with an improved user experience that also reduces the amount time of necessary to author a Social Media Video.

The techniques by which media carousel 311 selects and displays media assets are described in further detail, below. A media carousel displays media assets based on logic conditions. Conditions may be based on location information, date/time information, user information, social graph information, media asset metadata information, or the like, as described below.

A media carousel may display media assets based on location information. For example, a computing device may contain a GPS sensor that provides the location of the computing device, which is deemed a reliable proxy for user location. Location information may also be obtained by other means such as cell tower triangulation, an IP address, user input, or the like. If media assets have metadata that identifies an origin of the media asset, then GPS sensor information may be used to determine which media assets should be displayed in the media carousel. For example, a digital image file may have metadata in the form of a field that identifies the GPS location where the image was captured. The user's location may be compared to the metadata of the digital image file to determine whether the contents of the digital image file should be displayed as a relevant media asset. If the origin of a media asset is near the user's location, the media asset may be prioritized for display, meaning that the media asset may be displayed to the left of other media assets in a media carousel.

A media carousel may display media assets based on temporal (e.g., date/time) information. For example, a computing device may provide current date/time information, while media assets may include metadata indicating when the media asset was created. A media asset may be displayed on the condition that the media asset was created within a specified time before the current date/time. For example, the media carousel may display only media assets that were created within 24 hours of the current date/time. Additionally, media assets may be displayed based on the order in which they were created. For example, media assets created more recently are potentially more relevant to a user, and thus may be displayed ahead of media assets created longer ago.

A media carousel may display media assets based on social graphs. Consistent with the ordinary meaning of the term in the art, a "social graph" is a mapping of the connections or relationships between people, places, events, pets, and other entities. Various social networking web sites maintain social graphs of their users. A media asset may be displayed in the media carousel on the condition that it is accessible, as determined by a relevant social graph, to the author of a Social Media Video. Media assets may be accessible when two nodes (e.g., user accounts) in a social graph are connected. For instance, the media carousel may display images uploaded by FACEBOOK friends, by TWITTER followers, by PTCH tribe members, or by GOOGLE+ circle members of a Social Media Video author.

A media carousel may display media assets based on image recognition information. Image recognition information may be generated by applying an image recognition algorithm to a media asset. The metadata of the media asset may include the image recognition information generated by the image recognition algorithm. Image recognition algorithms may perform facial recognition, object recognition, color recognition, or the like. Image recognition information may include facial information, object information, color matching information, or the like. A media carousel may use image recognition information of media assets to identify and/or display other media asset(s) with matching or overlapping metadata information.

A media carousel may display media assets based on an audio signature. An audio clip, a video clip containing audio, or any other media asset that has an audio component may be analyzed to generate an audio signature. The audio signature may be included in the metadata of the analyzed media asset. The audio signature of a media asset may be used to identify and/or display another media asset with similar or related metadata information. The audio signature metadata information of two media assets may be considered similar if the metadata information, in terms of data values, are within a threshold of each other.

A media carousel may display media assets based on contents that have already been added into a Social Media Video. For example, the Social Media Video of FIG. 1 has the text "Varsity Volleyball." Based on the word "volleyball" appearing in the Social Media Video, media assets associated with volleyball may be displayed in the media carousel. A media asset may be considered to be associated with volleyball if its metadata includes the term "volleyball".

Note, the various conditions described above can be used in conjunction to identify media assets for display in a media carousel. For example, the media carousel may be populated with media assets that are produced by friends of the user at about the same place at about the same time.

Figure 4:
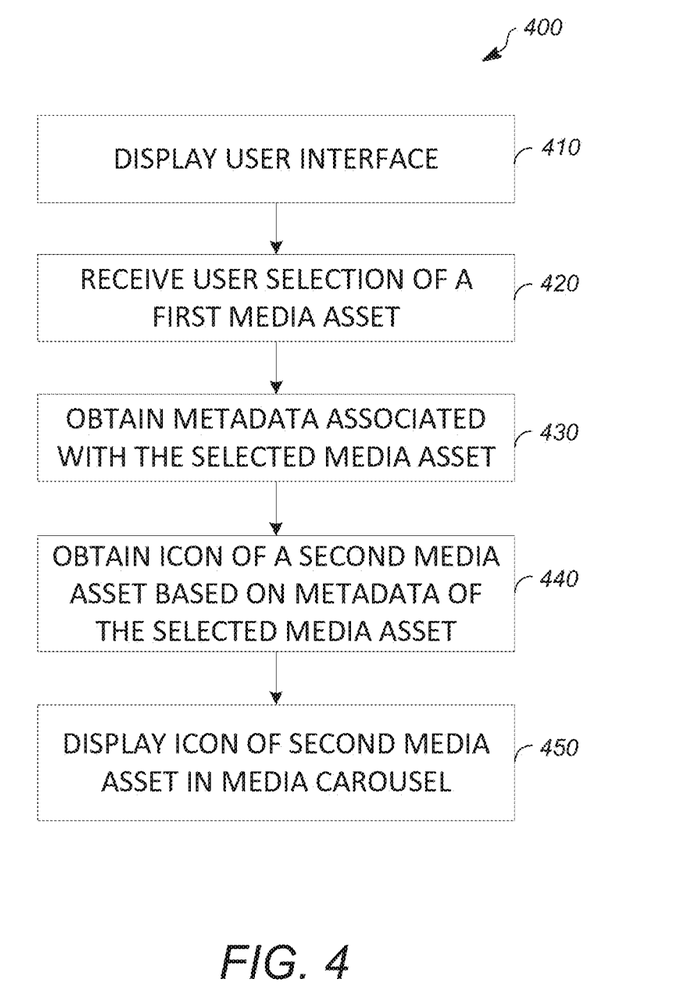
FIG. 4 depicts a block diagram of an exemplary process for displaying a media asset.

FIG. 4 illustrates exemplary process 400 that may be carried out by a computing device to dynamically control the display of media assets in the media carousel based on one or more of the conditions described above.

At block 410, a user interface for creating the Social Media Video is displayed. The user interface includes a media carousel for displaying icons representing media assets and for selecting media assets. The user interface also includes a timeline for displaying selected media assets. At block 420, a user selection of a first media asset is received. The user selection may be a swipe of an icon representing a first media asset displayed in the media carousel from the media carousel towards the timeline. Also, the user selection may be a tap on the icon representing the first media asset. At block 430, metadata associated with the selected media asset is obtained. Metadata may include, for example, date/time, author, title, description, location, recognized faces, recognized objects, recognized colors, audio signatures, or the like. At block 440, an icon of a second media asset is obtained based on the metadata associated with the selected media asset. At block 450, the icon of the second media asset is displayed in the media carousel.

Process 400 may be repeated as media assets are added to the Social Media Video in order to continually update the media carousel with relevant content. As an example, a condition may be set such that media assets are displayed based on the existing contents of the Social Media Video. For example, when a user adds a media asset to a Social Media Video, the metadata from the added content may be used in process 400 to update the media carousel with content related or similar to the media asset that was just added. By repeating process 400, the media carousel can provide more relevant results as the user adds content because additional content provides a greater amount of information about the subject of the Social Media Video being authored.

Figure 5:
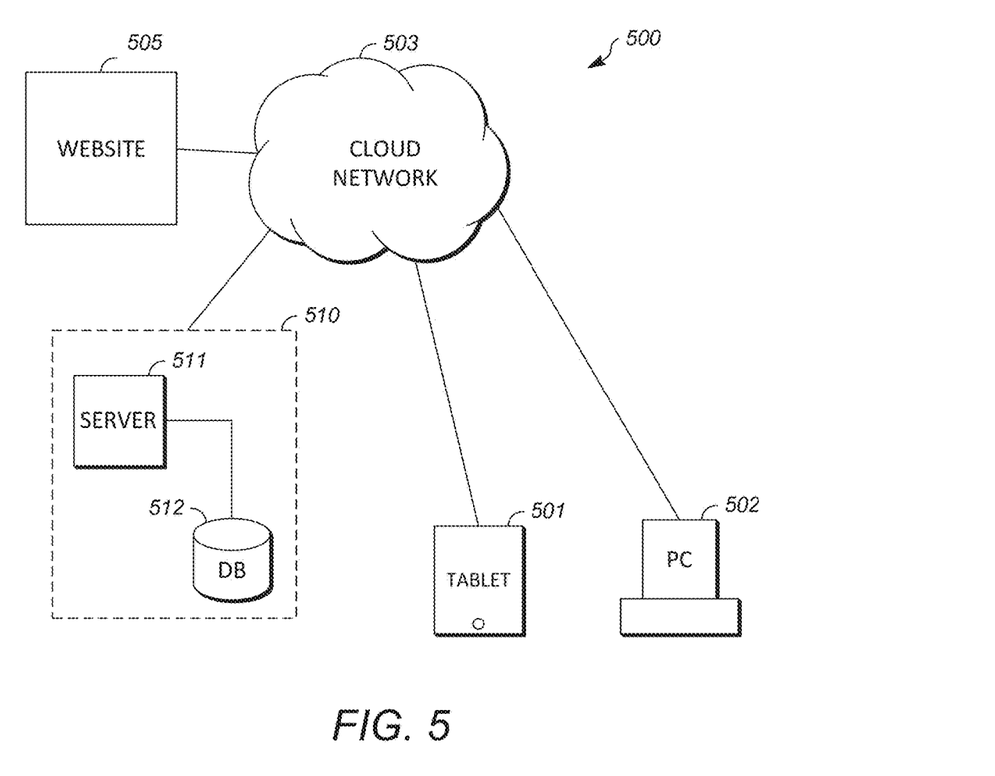
FIG. 5 depicts an exemplary Social Media Video system.

FIG. 5 illustrates an exemplary Social Media Video system 500 that supports the authoring of Social Media Videos. Exemplary Social Media Video system 500 includes Social Media Video service provider 510, which includes server 511 and database 512 for storing media assets, Social Media Videos, and other related data. Social Media Video service provider 510 is connected to cloud network 503. Mobile computing device 501 and computer 502 are connected to Social Media Video service provider 510 via cloud network 503. Third-party content provider 505 is connected to cloud network 503. Social Media Video service provider 510, mobile computing device 501, and desktop computer 502 are connected to third-party content provider 505 via cloud network 503. Mobile computing device 501 may be a cellular phone (e.g., a smartphone), a tablet computer, or a laptop computer, for example. Cloud network 503 may include portions of the Internet, a public network, a private network, or a combination thereof.

One or more of Social Media Video service provider 510 (e.g., server 511), mobile computing device 501, and/or desktop computer 502 may have computer-executable instructions for authoring, viewing, and/or revising Social Media Videos and their related data. One or more of third-party content provider 505, Social Media Video service provider 510 (e.g., server 511), mobile computing device 501, and/or desktop computer 502 may provide media assets for use in Social Media Videos, i.e., may be a media asset feed. Third-party content provider 505 may be a social networking web site, such as FACEBOOK.

3. Display of Commercial/Advertising Content

Although the foregoing techniques are described in the context of user-generated content, it should be noted that a media carousel may also be populated with commercial content in some embodiments. As used here, the term "user-generated content" is used consistent with its ordinary meaning in the art to refer to content created by technology consumers. In contrast, the term "commercial content" refers to content generated by a commercial provider of goods or services, such as a business organization. Exemplary commercial content includes product advertisements.

For example, using the above-described techniques, when the media carousel recognizes that a Social Media Video directed to volleyball is being authored, among the media assets displayed by the media carousel may be advertisements for a volleyball equipment manufacturer or a sporting goods store. As another example, when the media carousel recognizes that a Social Media Video contains many media assets taken near a particular landmark, the media carousel may display a curated image of the landmark, such as a corporate logo or a "hero shot" of the landmark.

A Social Media Video service provider may store and provide commercial content to Social Media Video users for a fee. For example, a volleyball manufacturer may pay Social Media Video service provider 510 (FIG. 5) to maintain and to cause the display of images of its volleyball products whenever the term "volleyball" is used in a Social Media Video being created on a computing device that is connected to the Social Media Video service provider.

Figure 6:
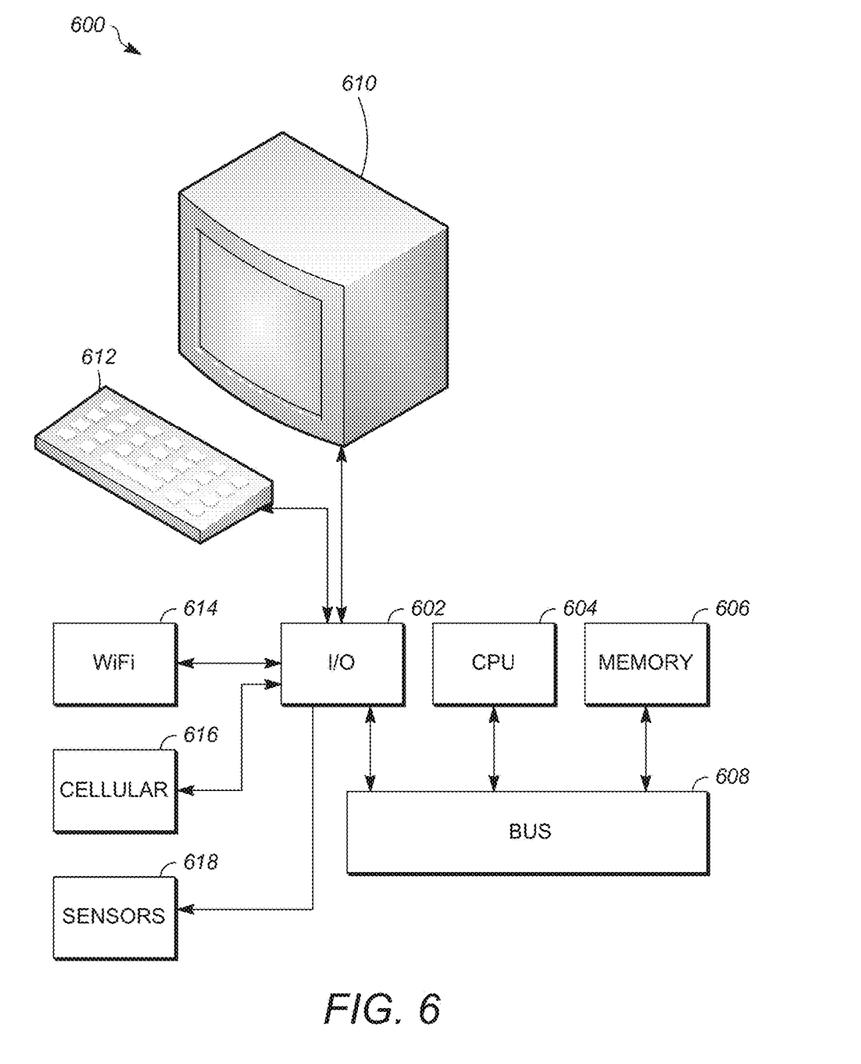
FIG. 6 depicts an exemplary computing system for performing Social Media Video processes.

The above-described processes and techniques may be implemented in exemplary computing system 600. As shown in FIG. 6, computing system 600 comprises a motherboard with bus 608 that connects I/O section 602, one or more central processing units (CPU) 604, and a memory section 606 together. Memory section 606 may contain computer executable instructions and/or data for carrying out process 400. The I/O section 602 may be connected to one or more display 610, input device 612, which may be a keyboard, a touch-sensitive surface, one or more buttons, a mouse, or the like. I/O section 602 may also be connected to Wi-Fi unit 614, cellular antenna 616, and/or sensors 618. Sensors 618 may include a GPS sensor, a light sensor, a gyroscope, an accelerometer, or a combination thereof.

At least some data in the above-described process can be saved into memory such as memory 606 for subsequent use. Memory 606 may include a non-transitory computer-readable medium that stores (e.g., tangibly embodies) one or more computer programs for performing any one of the above-described processes by means of a computer. The computer program may be written, for example, in a general-purpose programming language (e.g., C including Objective C, Java, JavaScript including JSON, and/or HTML) or some specialized, application-specific language.

Although only certain exemplary embodiments have been described in detail above, those skilled in the art will readily appreciate that many modifications are possible in the exemplary embodiments without materially departing from the novel teachings and advantages of this disclosure. For example, aspects of embodiments disclosed above can be combined in other combinations to form additional embodiments. Accordingly, all such modifications are intended to be included within the scope of this technology.

What is claimed is:

1. A computer-implemented method comprising:
   causing to be displayed, on one or more display screens, a user interface having functionality for creating a social media video, the user interface comprising a first region for selecting a media asset and a second region for displaying selected media assets, the first region including a displayable first icon representing a first media asset;
   receiving, from a user input device, a user selection of the first media asset, the user selection comprising information representing detection of a swipe of the first icon in a direction from the first region towards the second region;
   obtaining a first metadata information associated with the first media asset from the first region in accordance with the swipe represented by the received user selection;
   obtaining a second icon representing a second media asset based at least in part on the first metadata information of the first media asset;
   causing to be displayed, in the first region of the user interface, the second icon representing the second media asset;
   obtaining information indicating a physical location of the user input device; and
   causing to be displayed, the first icon representing the first media asset when the first metadata information indicates a first location within a predetermined distance of the physical location of the user input device.

2. The method of claim 1, wherein said physical location information is obtained from a
   global positioning system (GPS).

3. The method of claim 1, wherein the first metadata information comprises the first location information, wherein the first location information indicates the location at which the first media asset was created, and wherein the second media asset was created at a location within a predetermined distance of the first location.

4. The method of claim 1, wherein the first metadata information comprises a first timestamp indicating a date and/or time at which the first media asset was created, and wherein the second media asset was created within a timespan before or after the first timestamp.

5. The method of claim 1, wherein the first metadata information comprises a first social graph information, wherein the social graph information identifies a first node of a social graph, and wherein the second media asset is associated with a second node of the social graph, and the first node and the second node are connected on the social graph.

6. The method of claim 5, wherein the social graph is a social graph of a social networking website.

7. The method of claim 1, wherein when metadata of the first media asset indicates that the first media asset was created within a predetermined distance of a business, the second media asset represents the business.

8. The method of claim 7, wherein the second media asset is an advertisement for the business.

9. The method of claim 7, wherein the second media asset includes a picture of the business.

10. The method of claim 1, wherein the first metadata information comprises an image recognition information generated by an image recognition algorithm based on the first media asset, and wherein the second media asset is obtained based on the image recognition information.

11. The method of claim 10, wherein the generated recognition information is selected from the group consisting of facial information, object information, and color matching information.

12. The method of claim 1, wherein the first media asset includes audio, and the method further comprises: analyzing the audio, and obtaining the second media asset based on the audio analysis.

13. The method of claim 1, wherein the user interface is caused to be displayed on a cellular phone.

14. The method of claim 1, wherein the user interface is caused to be displayed on a tablet computer.

15. A non-transitory computer-readable storage medium tangibly encoded with computer-executable instructions, that when executed by a processor, perform a method comprising:
   causing to be displayed, on one or more display screens, a user interface having functionality for creating a social media video, the user interface comprising a first region for selecting a media asset and a second region for displaying selected media assets, the first region including a displayable first icon representing a first media asset;
   receiving, from a user input device, a user selection of the first media asset, the user selection comprising information representing detection of a swipe of the first icon in a direction from the first region towards the second region;
   obtaining a first metadata information associated with the first media asset from the first region in accordance with the swipe represented by the received user selection;

obtaining a second icon representing a second media asset based at least in part on the first metadata information of the first media asset;

causing to be displayed, in the first region of the user interface, the second icon representing the second media asset;

obtaining information indicating a physical location of the user input device; and causing to be displayed, the first icon representing the first media asset when the first metadata information indicates a first location within a predetermined distance of the physical location of the user input device.

16. The non-transitory computer-readable storage medium of claim 15, wherein said physical location information is obtained from a global positioning system (GPS).

17. The non-transitory computer-readable storage medium of claim 15, wherein the first metadata information comprises the first location information, wherein the first location information indicates the location at which the first media asset was created, and wherein the second media asset was created at a location within a predetermined distance of the first location.

18. The non-transitory computer-readable storage medium of claim 15, wherein the first metadata information comprises a first timestamp indicating a date and/or time at which the first media asset was created, and wherein the second media asset was created within a timespan before or after the first timestamp.

19. The non-transitory computer-readable storage medium of claim 15, wherein the first metadata information comprises a first social graph information, wherein the social graph information identifies a first node of a social graph, and wherein the second media asset is associated with a second node of the social graph, and the first node and the second node are connected on the social graph.

20. The non-transitory computer-readable storage medium of claim 19, wherein the social graph is a social graph of a social networking website.

21. The non-transitory computer-readable storage medium of claim 15, wherein when metadata of the first media asset indicates that the first media asset was created within a predetermined distance of a business, the second media asset represents the business.

22. The non-transitory computer-readable storage medium of claim 21, wherein the second media asset is an advertisement for the business.

23. The non-transitory computer-readable storage medium of claim 21, wherein the second media asset includes a picture of the business.

24. The non-transitory computer-readable storage medium of claim 15, wherein the first metadata information comprises an image recognition information generated by an image recognition algorithm based on the first media asset, and wherein the second media asset is obtained based on the image recognition information.

25. The non-transitory computer-readable storage medium of claim 24, wherein the generated recognition information is selected from the group consisting of facial information, object information, and color matching information.

26. The non-transitory computer-readable storage medium of claim 15, wherein the first media asset includes audio, and the computer-executable instructions further comprise:

analyzing the audio, and obtaining the second media asset based on the audio analysis.

27. The non-transitory computer-readable storage medium of claim 15, wherein the user interface is caused to be displayed on a cellular phone.

28. The non-transitory computer-readable storage medium of claim 15, wherein the user interface is caused to be displayed on a tablet computer.

29. A computing device comprising:

one or more processors operatively coupled to one or more display screens, a user input device, and a network interface, wherein the network interface is configured to connect with a network, and wherein the one or more processors are configured to:

cause to be displayed, on the one or more display screens, a user interface having functionality for creating a social media video, the user interface comprising a first region for selecting a media asset and a second region for displaying selected media assets, the first region including a displayable first icon representing a first media asset;

receive, from the user input device, a user selection of the first media asset, the user selection comprising information representing detection of a swipe of the first icon in a direction from the first region towards the second region;

obtain a first metadata information associated with the first media asset from the first region in accordance with the swipe represented by the received user selection;

obtain a second icon representing a second media asset based at least in part on the first metadata information of the first media asset; and cause to be displayed, in the first region of the user interface, the second icon representing the second media asset; and a location sensor operatively coupled to the one or more processors, the location sensor is configured to obtain information indicating a physical location of the user input device, and the one or more processors is further configured to cause to be displayed the first icon representing the first media asset when the first metadata information indicates a first location within a predetermined distance of the physical location of the user input device.

30. The computing device of claim 29, wherein said physical location information is obtained from a global positioning system (GPS) sensor operatively coupled to the one or more processors.

31. The computing device of claim 29, wherein the first metadata information comprises the first location information, wherein the first location information indicates the location at which the first media asset was created, and wherein the second media asset was created at a location within a predetermined distance of the first location.

32. The computing device of claim 29, wherein the first metadata information comprises a first timestamp indicating a date and/or time at which the first media asset was created, and wherein the second media asset was created within a timespan before or after the first timestamp.

33. The computing device of claim 29, wherein the first metadata information comprises a first social graph information, wherein the social graph information identifies a first node of a social graph, and wherein the second media asset is associated with a second node of the social graph, and the first node and the second node are connected on the social graph.

34. The computing device of claim 33, wherein the social graph is a social graph of a social networking web site.

35. The computing device of claim 29, wherein when metadata of the first media asset indicates that the first media asset was created within a predetermined distance of a business, the second media asset represents the business.

36. The computing device of claim 35, wherein the second media asset is an advertisement for the business.

37. The computing device of claim 35, wherein the second media asset includes a picture of the business.

38. The computing device of claim 29, wherein the first metadata information comprises an image recognition information generated by an image recognition algorithm based on the first media asset, and wherein the second media asset is obtained based on the image recognition information.

39. The computing device of claim 38, wherein the generated recognition information is selected from the group consisting of facial information, object information, and color matching information.

40. The computing device of claim 29, wherein the first media asset includes audio, and the one or more processors are further configured to: analyze the audio, and obtain the second media asset based on the audio analysis.

41. The computing device of claim 29, wherein the computing device is a cellular phone.

42. The computing device of claim 29, wherein the computing device is a tablet computer.

* * * * *